United States Patent
Göransson et al.

(10) Patent No.: US 8,320,825 B2
(45) Date of Patent: Nov. 27, 2012

(54) METHOD AND APPARATUS FOR REPEATING A SIGNAL IN A WIRELESS COMMUNICATION SYSTEM

(75) Inventors: Bo Göransson, Sollentuna (SE); Mats H. Andersson, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 582 days.

(21) Appl. No.: 12/092,011

(22) PCT Filed: Oct. 31, 2005

(86) PCT No.: PCT/SE2005/001635
§ 371 (c)(1),
(2), (4) Date: Jun. 2, 2009

(87) PCT Pub. No.: WO2007/053068
PCT Pub. Date: May 10, 2007

(65) Prior Publication Data
US 2011/0097992 A1   Apr. 28, 2011

(51) Int. Cl.
*H04B 7/14* (2006.01)
(52) U.S. Cl. ............. 455/7; 330/10; 332/183; 340/291; 370/274
(58) Field of Classification Search ............... 455/7, 16
See application file for complete search history.

(56) References Cited

U.S. PATENT DOCUMENTS

| | | | |
|---|---|---|---|
| 5,832,365 A | 11/1998 | Chen et al. | |
| 5,970,410 A * | 10/1999 | Carney et al. | 455/446 |
| 6,018,317 A * | 1/2000 | Dogan et al. | 342/378 |
| 6,339,707 B1 * | 1/2002 | Wainfan et al. | 455/427 |
| 6,487,187 B1 * | 11/2002 | Schmutz et al. | 370/337 |
| 6,678,253 B1 * | 1/2004 | Heath et al. | 370/265 |
| 6,690,915 B1 | 2/2004 | Ito et al. | |
| 6,757,265 B1 * | 6/2004 | Sebastian et al. | 370/319 |
| 6,785,513 B1 * | 8/2004 | Sivaprakasam | 455/63.1 |
| 6,826,164 B2 * | 11/2004 | Mani et al. | 370/334 |
| 7,006,461 B2 * | 2/2006 | Kilfoyle et al. | 370/315 |
| 7,020,436 B2 * | 3/2006 | Schmutz | 455/9 |
| 7,069,053 B2 * | 6/2006 | Johannisson et al. | 455/562.1 |
| 7,084,701 B2 * | 8/2006 | Mendoza et al. | 330/51 |
| 7,091,772 B2 * | 8/2006 | Friedel et al. | 330/10 |
| 7,206,350 B2 * | 4/2007 | Korobkov et al. | 375/260 |

(Continued)

FOREIGN PATENT DOCUMENTS

EP 0833403 A2 1/1998

OTHER PUBLICATIONS

Zachariadis, K.E. et al: Source fidelity over a two-hop fading channel Military Communications Conference, 2004. MILCOM 2004. IEEE, vol. 1, no.pp. 134-139 vol. 1, Oct. 31-Nov. 3, 2004.

(Continued)

*Primary Examiner* — Hai Nguyen (57) ABSTRACT

The invention relates to communication in a wireless communications network in which a cell comprises areas with different topographies, for example between indoor and outdoor areas. The communication is optimized by means of a repeater for use in a fixed wireless broadband communications system, comprising receiving means for receiving a downlink signal from a base station, signal processing means for processing the downlink signal to produce an output signal, and transmitting means for transmitting the output signal, said repeater being characterized in that it comprises means for creating diversity in the output signal.

18 Claims, 3 Drawing Sheets

U.S. PATENT DOCUMENTS

| | | | |
|---|---|---|---|
| 7,274,938 B2* | 9/2007 | Krenik et al. | 455/450 |
| 7,551,546 B2* | 6/2009 | Ma et al. | 370/208 |
| 7,729,432 B2* | 6/2010 | Khan et al. | 375/260 |
| 7,773,564 B2* | 8/2010 | Heath et al. | 370/334 |
| 7,778,596 B2* | 8/2010 | Anderson et al. | 455/11.1 |
| 7,831,263 B2* | 11/2010 | Sheynblat et al. | 455/456.5 |
| 7,929,942 B2* | 4/2011 | Schefczik et al. | 455/404.1 |
| 7,953,039 B2* | 5/2011 | Khan | 370/329 |
| 8,027,392 B2* | 9/2011 | Hara et al. | 375/260 |
| 8,032,172 B2* | 10/2011 | Adkins et al. | 455/522 |
| 8,050,212 B2* | 11/2011 | Chandra et al. | 370/315 |
| 8,072,261 B2* | 12/2011 | Yamanouchi et al. | 330/9 |
| 8,155,039 B2* | 4/2012 | Wu et al. | 370/310 |
| 2002/0028655 A1* | 3/2002 | Rosener et al. | 455/16 |
| 2003/0123383 A1* | 7/2003 | Korobkov et al. | 370/208 |
| 2003/0139198 A1* | 7/2003 | Johannisson et al. | 455/525 |
| 2004/0008081 A1* | 1/2004 | Friedel et al. | 330/10 |
| 2006/0077886 A1* | 4/2006 | Oh et al. | 370/208 |
| 2006/0189335 A1* | 8/2006 | Hara et al. | 455/509 |
| 2006/0239180 A1* | 10/2006 | Khan et al. | 370/208 |
| 2006/0239226 A1* | 10/2006 | Khan | 370/329 |
| 2007/0098097 A1* | 5/2007 | Khan et al. | 375/260 |
| 2007/0183308 A1* | 8/2007 | Korobkov et al. | 370/208 |
| 2009/0315620 A1* | 12/2009 | Yamanouchi et al. | 330/10 |
| 2010/0284446 A1* | 11/2010 | Mu et al. | 375/211 |
| 2011/0200134 A1* | 8/2011 | Khan | 375/267 |

OTHER PUBLICATIONS

Bao, X. et al: Decode-amplify-forward (DAF): A new class of forwarding strategy for wireless relay channels• Signal Processing Advances in Wireless Communications, 2005 IEEE 6th Workshop on pp. 816-820, Jun. 5-8, 2005.

Huining Hu et al: Range extension without capacity penalty in cellular networks with digital fixed relays. Global Telecommunications Conference, 2004. GLOBECOM '04. IEEE, vol. 5,.pp. 3053-3057 vol. 5, Nov. 29-Dec. 3, 2004.

Levin, D: Capacity in Cellular Networks with Shared MIMO Links and Channel-Aware Scheduling. Master's Thesis, Radio, School of Electrical Engineering, Royal Institute of Technology (KTH), Stockholm, Mar. 2005, ISSN 1400-9137, ISRN KTH/(KTH),-May 2006—SE. Retrieved at www.ee.kth.se/php/modules/publications/reports/2005/1948.pdf.

* cited by examiner

METHOD AND APPARATUS FOR REPEATING A SIGNAL IN A WIRELESS COMMUNICATION SYSTEM

TECHNICAL FIELD

The present invention relates to a repeater for use in a wireless communications system as defined in the preamble of claim 1, to communication methods as defined in the preambles of claims 10 and 20, respectively, and to a wireless communication system as defined in the preamble of claim 18.

BACKGROUND AND PRIOR ART

Repeaters are a cost-efficient way to increase the coverage in a wireless communications system. Several repeater nodes can be placed within the coverage range of a particular base station. The repeater nodes extend the effective coverage of the base station, that is, the size of the cell, by retransmitting the signal received from the base station.

Repeaters are sometimes used to provide indoor coverage from an outdoor base station. The attenuation in walls is in the order of 10-20 dB, which means that without a repeater the signal strength experienced by indoor terminals may be very small. A simple repeater may be used to amplify the signal and create an indoor signal strength of an appropriate level.

Frequency and time diversity are fundamental parts of a communications system.

The conditions for wireless communication inside a building typically differ significantly from those outdoors.

The term diversity gain refers to the increase in the signal field strength in a cell that can be achieved by means of diversity, for example, frequency or time diversity. A diversity gain can be achieved by means of coding and interleaving in the time and frequency domain. The diversity gain can also be realized by means of scheduling. In this case the channel quality to each user is measured, and a scheduler allocates data only to users having good channel conditions. Assuming that the channel conditions are good for all users at some time each user can receive data when his channel conditions are good. In this way, the waste of system resources, for example, transmission power is minimized.

Frequency selective fading is encountered in scenarios where a large delay spread is present. This is usually the case in large macro cells. In contrast, indoor scenarios often have a nearly flat fading in the frequency domain. Hence, the gain of frequency domain coding and scheduling is limited in an indoor scenario.

In the same way it can be argued that time domain selectivity may be very different between for example, an indoor and an outdoor cell. This is because indoor users and their surroundings are relatively stationary, while outdoor users are more likely to move. Also, surrounding objects such as cars also contribute to time selectivity. The rate of time selectivity is important in system design, since this is related to system parameters such as slot length, pilot density etc.

Also, since the requirements from different areas of a cell may be very different, it may be impossible to optimize system parameters for all users in a cell. In particular the requirements from outdoor and indoor users will typically be very difficult. Similar problems may arise if a cell covers an outdoor cell comprising areas with very different topographies.

OBJECT OF THE INVENTION

It is an object of the present invention to optimize communication in a wireless communications network in which a cell comprises areas with different topographies, for example between indoor and outdoor areas.

SUMMARY OF THE INVENTION

This object is achieved according to the present invention by a repeater for use in a wireless communications system, comprising receiving means for receiving a communication signal from a communication unit in the communications system, signal processing means for processing the communication signal to produce an output signal, and transmitting means for transmitting the output signal, said repeater being characterized in that it comprises means for creating diversity in the output signal.

The object is also achieved by a communication method for use in a wireless communication system, for repeating signals transmitted by a communication unit in a wireless network, comprising the steps of:
receiving in a repeater a communication signal from the communication unit,
processing the communication signal to produce an output signal from the repeater
transmitting the output signal from the repeater in such a way as to create diversity.

The object is also achieved by a wireless communications system comprising at least one base station and at least one user terminal arranged to transmit communication signals to each other, said system further comprising a repeater as defined above, arranged to receive said communication signals from the base station or the user terminal, process the signal in such a way as to create diversity and transmit the processed signal to the user terminal or the base station, respectively.

The object is also achieved by a communication method for use in a wireless cornmunications system, comprising the steps of
transmitting from a first communication unit in the system a communication signal intended for a second communication unit in the system,
receiving the communication signal in a repeater,
processing the communication signal to produce an output signal from the repeater
transmitting the output signal from the repeater in such a way as to create diversity.

According to the invention an artificial time and frequency domain fading can be created by the repeater.

The communication unit may be, for example, a user terminal or a base station in a wireless communications network. The communication signal may be a downlink or an uplink signal.

In contrast to this, as explained above, the diversity created in wireless communications systems today is either created by the base station or caused by reflections by objects in the cell. In the former case the diversity is the same in the whole cell. In the latter case the diversity cannot be controlled, and may vary between different parts of the cell depending on their topography. In particular they will vary between an outdoor environment having high diversity and an indoor environment in which there is very little diversity.

The inventive solution achieves the object stated above by enabling the diversity of the system to be controlled. In particular, the diversity in different parts of one cell can be controlled independently of each other. This enables the creation of optimal time and frequency selectivity in different parts of the cell. This is particularly useful when indoor scenarios should be covered by outdoor base stations.

The transmitting means may comprise one antenna and a control unit for controlling the antenna so as to create the diversity.

Alternatively, the transmitting means may comprise two or more antennas and a control unit for controlling the antennas so as to create the diversity.

The receiving means may also comprise one antenna or, alternatively at least two antennas. In the latter case, the signal processing means may be arranged to filter out a part of the downlink signal. This may be achieved in the spatial domain by creating a lobe, or by common filtering in the time and/or frequency domain. This is particularly useful if the repeater receives the signal from the base station along different paths (path diversity). In this case, the strongest signal, usually the one received most directly from the base station, can be kept, while the other signals are filtered out.

The control unit may be arranged to create time, frequency or phase diversity. If the transmitting means comprises two or more antennas, the control unit may be arranged to create time, frequency or phase diversity, as well as spatial diversity and pattern diversity.

If a communications link between the repeater and the system is used, the repeater can measure certain channel parameters and feed them back to the system. In this case, the repeater may also comprise a measuring unit for measuring parameters related to the downlink signal and transmission means for transmitting said parameters to the base station. The system can then respond with optimal settings on the adjustable parameters in the repeater, such as time delay, frequency shift and phase rotation angle, that is, parameters that can be changed between different transmit branches. In this way it is possible to adapt the delay and/or phase rotation in the repeater node to the current traffic load and other parameters at any given time.

The communication system may be any type of wireless system in which repeaters are used, for example a fixed wireless broadband communications system.

BRIEF DESCRIPTION OF THE DRAWINGS

The present invention will be described in more detail in the following, with reference to the appended drawings, in which.

DETAILED DESCRIPTION OF EMBODIMENTS

Figure 1:
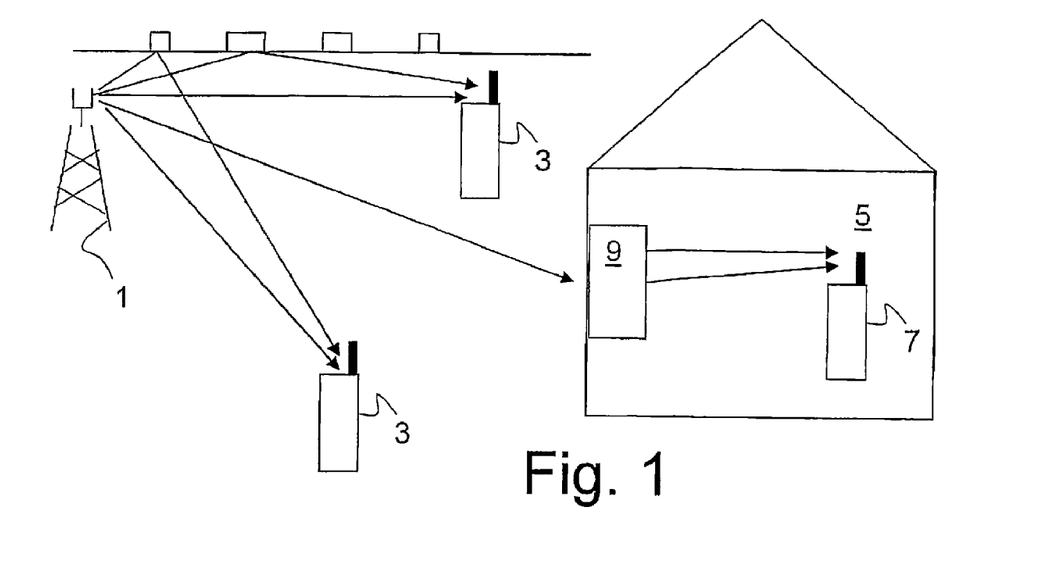
FIG. 1 shows a cellular network in which the invention may be applied.

FIG. 1 shows a network in which the method and apparatus according to the invention can be applied advantageously. In a cellular network a base station 1 is located outdoors. The base station 1 communicates over the radio interface with a number of user terminals 3 located outdoors in the base station's 1 cell. For each of these user terminals 3, reflections from the surroundings ensure diversity in that each terminal 3 receives the same signal through several paths, typically a direct path from the base station 1 and one or more paths including reflections from buildings or other structures located between the base station 1 and the user terminal 3. This provides for a diversity gain.

In the base station's 1 cell there is also a building 5 in which a user terminal 7 is located. Because of the attenuation in the wall of the building 5 a repeater 9 is placed on the wall to amplify the signal for the benefit of the user terminal 7 inside the building. According to the invention, to increase the diversity inside the building the repeater is arranged to transmit the signal inside the building in such a way that diversity is created. This will provide for a diversity gain in the communication with the terminal 7 inside the building 5.

The repeater 9 may be a simple repeater that simply amplifies and forwards the signal received from the base station 1 and the terminal 7. It may also be a somewhat more complex repeater which filters out the desired frequency band and amplifies and forwards only this frequency band. Active repeaters, which demodulate the signal, selects the data intended for a particular user and modulates and forwards these data can also be used.

Figure 2:
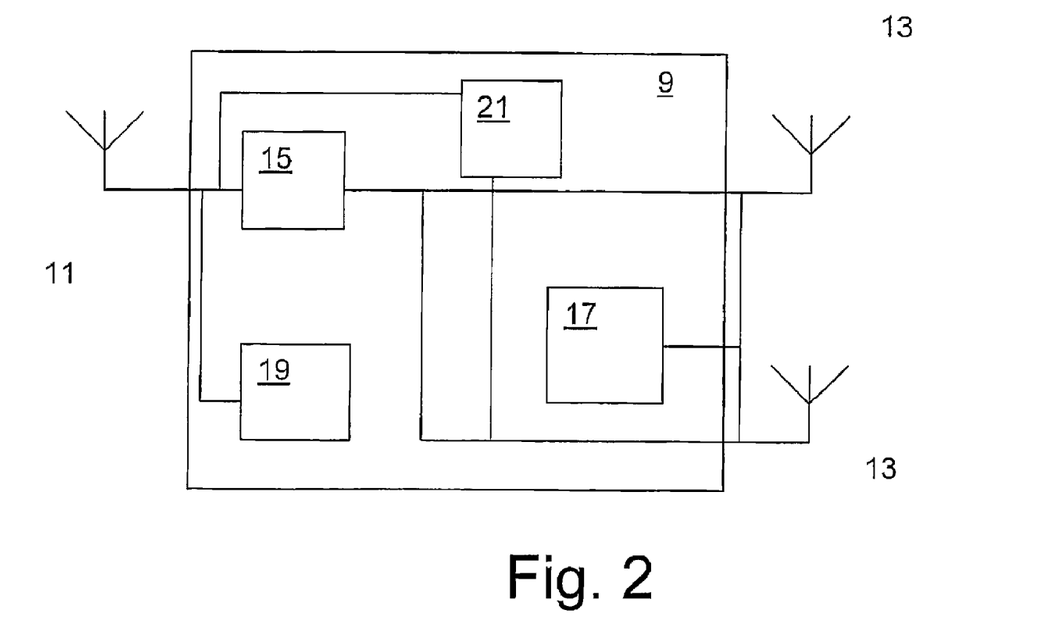
FIG. 2 illustrates a repeater according to the invention.

The repeater 9 comprises at least one outdoor antenna for communicating with the base station 1 and at least one indoor antenna for communicating with the terminal 7 (or terminals) inside the building. FIG. 2 shows the repeater comprising one outdoor antenna 11 and two indoor antennas 13. Between the outdoor antenna 11 and the indoor antennas 13 there is a signal processing means 15, which in its simplest form is just an amplifier. According to the invention the indoor antennas 13 are controlled by control means 17 in such a way as to provide diversity to the signal. Several types of diversity may be provided, including:

time diversity: transmitting the signal more than once, at different points in time frequency diversity: transmitting the signal on more than one frequency phase rotation diversity: varying the phase of the signal All the types of diversity mentioned above can be achieved using one antenna controlled in the appropriate way.

In addition, if two or more indoor antennas are used spatial diversity or pattern diversity may be achieved. In spatial diversity the antennas are arranged to transmit the signal in at least two different directions. In pattern diversity the signal is transmitted from at least two antennas having different radiation patterns. Two or more antennas may also be used to create time diversity, frequency diversity of phase rotation diversity.

The terms indoor and outdoor antennas are used to distinguish the antennas used for communicating with the base station from the ones used to communicate with the indoor user terminal. Even though they are relevant in a preferred embodiment, all antennas may be located outdoors, or indoors, depending on the situation.

The repeater may also, alternatively, or in addition to the functions described above, comprise means (not shown) for creating diversity in the uplink signal. In this case, the means for creating diversity controls the transmission from the outdoor antennas. Thus, the invention is suited for creating diversity in communication signals received in the repeater from any communication unit in the system, such as a base station or a user terminal. The communication signals, accordingly, may be uplink or downlink signals, or both.

As is common in the art, the mobile terminals 3, 7 measure channel parameters and feed them back to the base station. In this way, the base station 1 can respond by changing the parameter settings to improve the communication channel. In the case of a simple repeater, that simply forwards the signals from the base station 1 to the user terminal 7 and vice versa, the base station 1 is not aware that a repeater is used, or that the terminal 7 is located indoors, and therefore cannot adjust the parameters in an optimal way. According to a preferred embodiment of the invention, therefore the repeater comprises a measuring unit 19 arranged to measure certain channel parameters, such as delay spread, coherence bandwidth and coherence time, related to the communication between the repeater 9 and the base station 1 and/or between the repeater 9 and the user terminal 7, and feed them back to the base station 1 through the outdoor antennas 11. Alternatively, the feedback may be through another communication system, which may be wireless or wire-bound. In this way the base station 1 will have information about the quality of the whole communication path to the user terminal 7 and about the quality of the communication path between the base station 1 and the repeater 9. The system can then respond with optimal settings of the adjustable parameters in the repeater 9. In this case the base station may set the parameters controlling how the repeater should generate diversity to optimize the communication with the user terminal 7.

The repeater can also be provided with control means 21 for controlling the communication between the repeater 9 and the base station 1 and between the repeater and the user terminal 7.

In either case the communication between the repeater 9 and any user terminals communicating with the repeater can be optimized. If there are several repeaters in the cell, each repeater can create diversity in its own way according to the conditions it is experiencing. Thus, the flexibility within one cell is increased, since the parameters for different parts of the cell may be set individually depending on the conditions in each part.

As mentioned above the repeater may have one or more outdoor antennas, that is, antennas communicating with the base station 1. The use of more than one outdoor antenna is advantageous in cases of diversity, for example, as illustrated in FIG. 3.

Figure 3:
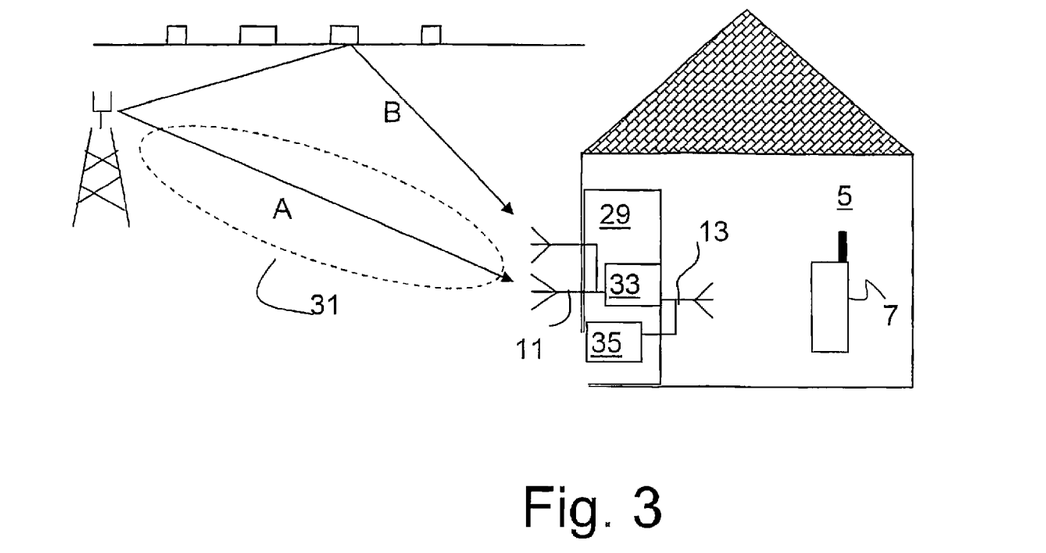
FIG. 3 illustrates a cellular network including a repeater according to the invention

FIG. 3 illustrates a system similar to the one shown in FIG. 1, where a base station 1 sends a signal that is received by a repeater 29. The signal reaches the repeater 29 along two paths, one, captioned A in FIG. 3, direct and one, captioned B, reflected by structures within the cell. This creates time diversity. Typically the direct signal A will be stronger than the reflected signal B. If the repeater only had one outdoor antenna, both signals A and B would have to be forwarded to the user terminal. If the repeater 9 includes more than one antenna, as shown in FIG. 3, the repeater can create a lobe 31 in which the reflected signal B is filtered out, keeping only the direct signal A. This can be performed, for example, by signal processing means 33, which is connected between the outdoor 11 and indoor antennas 13.

The repeater shown in FIG. 3 comprises one indoor antenna 13, that is, an antenna for communicating with user terminals, and a control unit 35 arranged to provide a desired time delay $\Delta\tau$ between two transmissions of the same signal, to create time diversity. The timing of the signals may be selected in such a way as to optimize the use of network resources. As mentioned above, it would be possible to use two or more indoor antennas as well.

When creating the desired diversity in the signal the repeater, by means of the control unit, can arrange the signals is such a way as to optimize the use of network resources. In particular, when creating time diversity the delay between two signals can be adjusted so that the frequency, $f_{min}$ where a deep null is created in the frequency spectrum is varied between different users. In this way, the total capacity in the system can be increased by using a scheduler that is aware of the link quality in the frequency domain.

Similar procedures may be applied for the other types of diversity. For example the phase difference between two antennas may be adjusted in dependence of the terminal's position, or some other parameter, in such a way as to optimize the sum of the effect of the channel and the repeater.

Figure 4A:
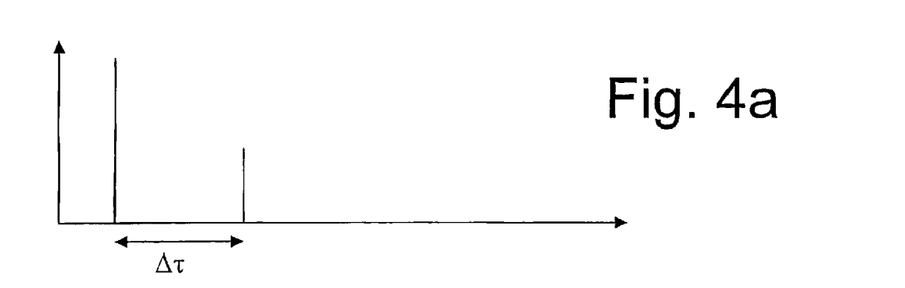
FIGS. 4a-4c illustrate schematically time delay and resulting frequency spectra
Figure 4B:
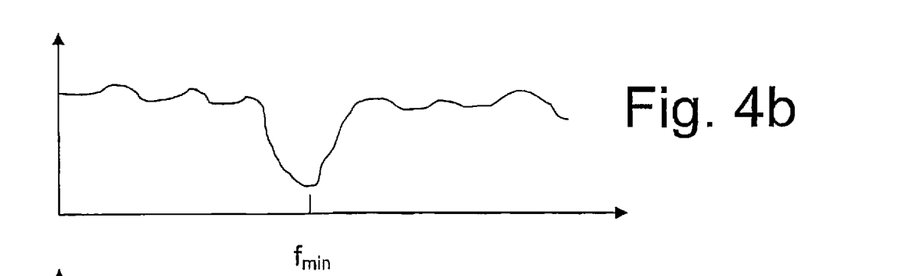
Figure 4C:
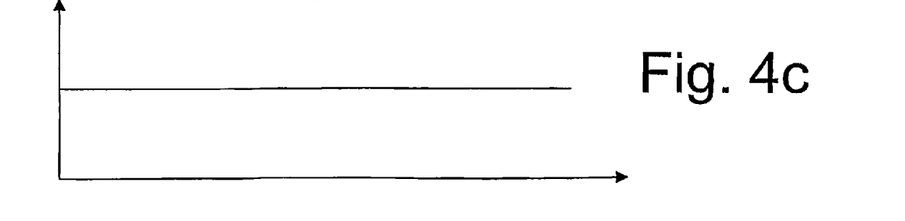

FIGS. 4a-4c illustrates schematically time diversity and the resulting frequency spectrum. If the signal is received by two different paths, as illustrated in FIG. 3, two peaks A and B will be received, with a time delay of $\Delta\tau$ between them, as shown in FIG. 4a. In this case, if the repeater comprises only one outdoor antenna, that is, an antenna for communicating with the base station, it must forward both signals A and B with the same delay $\Delta\tau$ to the user terminal 7. If, on the other hand, more than one outdoor antenna is present, the signal B can be filtered out so that only signal A is forwarded. The time diversity, or other form of diversity, to be applied to signal A can then be selected freely. An example of a resulting frequency spectrum in such a case is shown in FIG. 4b. The signal strength varies across the frequency spectrum and typically has a minimum for some frequency $f_{min}$ somewhere in the spectrum. If no diversity is present, that is only one beam is transmitted and received, the frequency spectrum will be essentially flat, as shown in FIG. 4c. This is the case, in particular, indoors.

Figure 5:
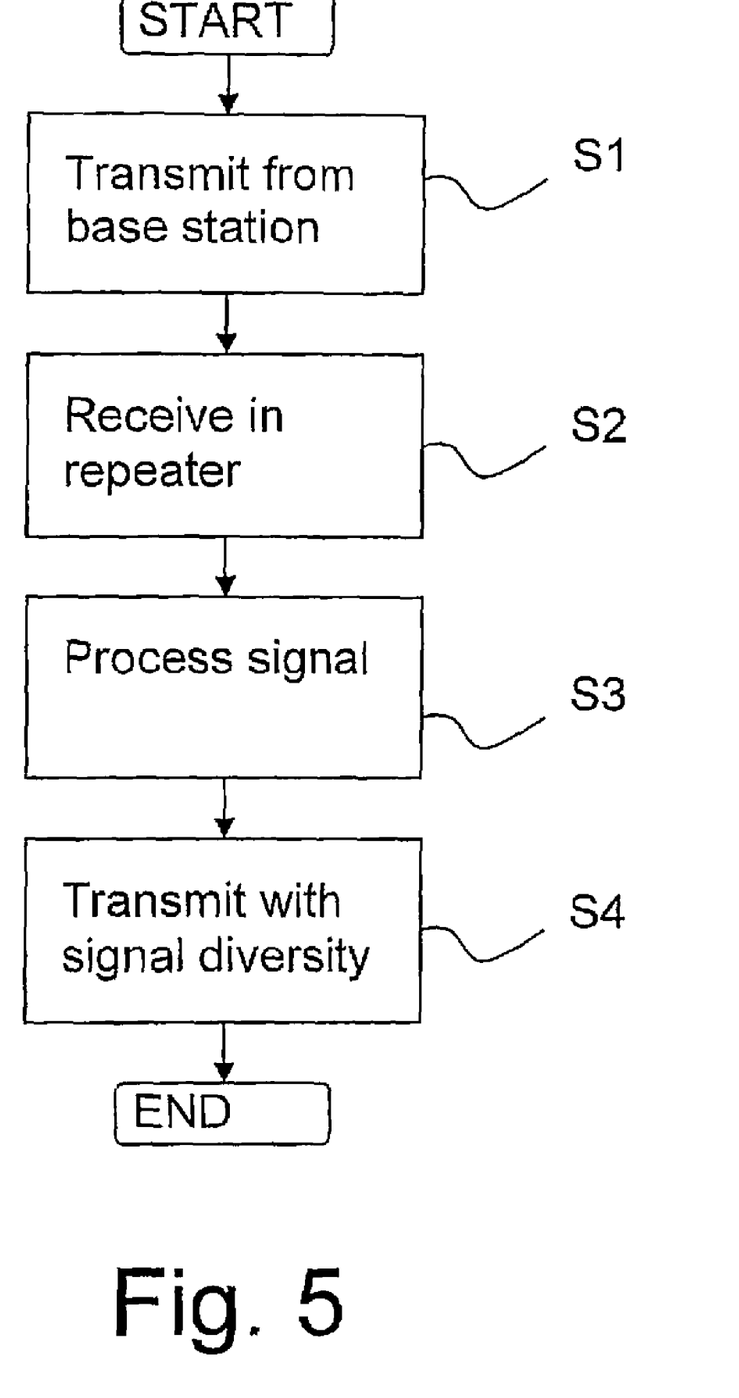
FIG. 5 is a flow chart of the basic method according to the invention

FIG. 5 is a flow chart of the method according to the invention.

In step S1 the base station transmits a downlink signal to a user terminal in the way common in the art.

In step S2 the downlink signal is received in a repeater.

In step S3, A signal processing unit in the repeater processes the downlink signal to produce a repeater output signal In step S4, repeater transmits the output signal in such a way as to create diversity. The repeater output signal is received, with diversity, in the user terminal.

As discussed above, in step S4 the repeater may transmit the output signal on one or more output antennas controlled by a control unit.

The method may also be performed in the opposite direction, that is, the repeater may be used to create diversity in the uplink signal from the user terminal to the base station.

In step S2, the repeater may receive the downlink signal on one input antenna. Alternatively, the repeater may receive the downlink signal on at least two input antennas. In this case, the processing in step S3 may include filtering out a lobe of the downlink signal. This enables the selection of a strong signal, and the filtering out of weaker signals, if the same signal is received, for example, along different paths from the base station.

The repeater may also be arranged to measure parameters related to the downlink signal and transmitting said parameters to the base station.

In situations where the channel variations are small, for example, indoors, channel dependent scheduling has very little effect since the channel is stable. By inducing channel variations the effect of channel dependent scheduling is enhanced. Thus, the system can select to transmit to the user terminal that, at a given point in time, has the best channel.

Indoors, the channel characteristics are far more constant and longer slots would be possible. On the one hand, fading is desirable since it creates diversity. On the other hand, too much fading is not good, since it makes the channels less constant. If the Doppler shift is smaller than that for which the system was designed, phase diversity may be introduced to compensate for this, if the channel is very stable, for example, in parts of the cell, such as it will be indoors.

The spreading out or "smearing" of the received signal that occurs when identical signals arrive via different paths and have different time delays is referred to as delay spread. The channel length is equal to the delay spread. In, for example, OFDM systems a cyclic prefix may be used to maintain orthogonality in the system. The cyclic prefix should have at least the same length as the channel impulse response in order to maintain orthogonality. This means that for most cells it will be longer than necessary. A long cyclic prefix increases the signalling overhead in the system. The invention may be used to make the channel length approximately equal throughout the cell.

Thus, more diversity may be created by introducing time dispersion while at the same time keeping the orthogonality in the system. In this case the time dispersion and the delay diversity must be smaller than the cyclic prefix for which the system is designed. This will be particularly useful in indoor environments.

The invention can be applied to a any type of wireless communication systems in which repeaters are used, including, for example, OFDM systems such as S3G, 802.11, 802.16 (WiMAX) and other WLAN/FWA (Wireless Local Area Network/Fixed Wireless Access) standards, such as hiperlan/access.

The invention claimed is:

1. Previously Presented) A repeater for use in a wireless communications system, comprising:
    receiving means for receiving a communication signal through the air interface from a communication unit in the communications system,
    signal processing means for processing the communication signal to produce an output signal,
    transmitting means for transmitting the output signal,
    where said repeater comprises means for creating diversity in the output signal by creating artificial time and frequency domain fading,
    a measuring unit for measuring parameters related to a downlink signal,
    transmission means for transmitting said parameters to the base station, and
    wherein said parameters can be set by the base station in order to control how the repeater generates diversity to optimize communication.

2. A repeater according to claim 1, wherein the receiving means is arranged to receive a downlink signal from a base station as the communication signal.

3. A repeater according to claim 1, wherein the receiving means is arranged to receive an uplink signal from a mobile terminal as the communication signal.

4. A repeater according to claim 1, wherein the transmitting means comprises one antenna and a control unit for controlling the antenna so as to create the diversity.

5. A repeater according to claim 1, wherein the transmitting means comprises at least two antennas and a control unit for controlling the antennas so as to create the diversity.

6. A repeater according to claim 1 wherein the receiving means comprises at least two antennas and the signal processing means is arranged to filter out a part of the downlink signal.

7. A repeater according to claim 6, wherein the signal processing means is arranged to filter out the part by creating a lobe.

8. A repeater according to claim 1 wherein the control unit arranged to create time, frequency, phase or spatial diversity.

9. A communication method for use in a wireless communication system, for repeating signals transmitted by a communication unit in a wireless network, comprising the steps of:
    receiving in a repeater a communication signal from the communication unit,
    processing the communication signal to produce an output signal from the repeater,
    transmitting the output signal from the repeater in such a way as to create diversity by creating artificial time and frequency domain fading,
    measuring, in the repeater, parameters related to the communication signal, and
    transmitting said parameters to the base station, wherein said parameters can be set by the base station in order to control how the repeater generates diversity to optimize communication.

10. A method according to claim 9, wherein the communication signal is a downlink signal from a base station.

11. A repeater according to claim 9, wherein the communication signal is an uplink signal from a user terminal.

12. A method according to claim 9, wherein diversity is created using one output antenna controlled by a control unit to transmit the output signal.

13. A method according to claim 9, wherein diversity is created using at least two output antennas controlled by a control unit to transmit the output signal.

14. A method according to claim 9, wherein the communication signal is received on at least two input antennas and the processing in the signal processing means includes filtering out a part of the communication signal.

15. A method according to claim 14, comprising the step of filtering out a part of the communication signal involves creating a lobe.

16. A wireless communications system comprising:
    at least one base station and
    at least one user terminal arranged to transmit communication signals to each other,
    said system further comprising a repeater, arranged to:
        receive said communication signals from the base station and/or the user terminal,
        process the signals so as to create diversity by creating artificial time and frequency domain fading,
        transmit the processed signals to the user terminal and/or the base station,
        measure parameters related to the communication signal, and
        transmit said parameters to the base station,
    wherein said base station sets said parameters in order to control how the repeater generates diversity to optimize communication.

17. A wireless communication system according to claim 16, which is a fixed wireless broadband communication system.

18. A communication method for use in a wireless communications system, comprising the steps of:
    transmitting from a first communication unit in the system a communication signal intended for a second communication unit in the system,
    receiving the communication signal in a repeater
    processing the communication signal to produce an output signal from the repeater
    transmitting the output signal from the repeater in such a way as to create diversity by creating artificial time and frequency domain fading,
    measuring, in the repeater, parameters related to the communication signal, and
    transmitting said parameters to the base station, wherein said parameters can be set by the base station in order to control how the repeater generates diversity to optimize communication.

* * * * *

UNITED STATES PATENT AND TRADEMARK OFFICE
CERTIFICATE OF CORRECTION

PATENT NO. : 8,320,825 B2
APPLICATION NO. : 12/092011
DATED : November 27, 2012
INVENTOR(S) : Goransson et al.

It is certified that error appears in the above-identified patent and that said Letters Patent is hereby corrected as shown below:

On Page 2, in Field (56), under "OTHER PUBLICATIONS", in Column 2,
Line 1, delete "Decode-amplify-forward" and insert -- Decode-Amplify-Forward --, therefor.

In Column 2, Line 23, delete "repeater" and insert -- repeater, --, therefor.

In Column 2, Line 36, delete "cornmunications system," and insert -- communications system, --, therefor.

In Column 2, Line 43, delete "repeater" and insert -- repeater, --, therefor.

In Column 3, Line 48, delete "invention" and insert -- invention. --, therefor.

In Column 3, Line 50, delete "spectra" and insert -- spectra. --, therefor.

In Column 3, Line 52, delete "invention" and insert -- invention. --, therefor.

In Column 5, Lines 35-48, delete "FIG. 3........antenna 13." and
insert the same at Line 34 as a continuation paragraph.

In Column 6, Line 29, delete "signal" and insert -- signal. --, therefor.

In Column 7, Line 23, in Claim 1, delete "Previously Presented)".

In Column 7, Line 52, in Claim 6, delete "claim 1" and insert -- claim 1, --, therefor.

In Column 7, Line 59, in Claim 8, delete "claim 1" and insert -- claim 1, --, therefor.

In Column 7, Lines 59-60, in Claim 8, delete "unit arranged" and insert -- unit is arranged --, therefor.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,320,825 B2

In Column 8, Line 14, in Claim 11, delete "repeater" and insert -- method --, therefor.

In Column 8, Line 54, in Claim 18, delete "repeater" and insert -- repeater, --, therefor.

In Column 8, Line 56, in Claim 18, delete "repeater" and insert -- repeater, --, therefor.